United States Patent [19]

Bosse

[11] 4,427,286
[45] Jan. 24, 1984

[54] ELECTROPHOTOCOPIER LINE SCANNING ILLUMINATOR

[75] Inventor: Thomas W. Bosse, New Milford, Conn.

[73] Assignee: Pitney Bowes Inc., Stamford, Conn.

[21] Appl. No.: 397,396

[22] Filed: Jul. 12, 1982

[51] Int. Cl.³ .................. G03G 15/04; G03G 15/30
[52] U.S. Cl. .................................. 355/3 R; 355/8; 355/14 R; 355/14 E; 355/57; 355/60
[58] Field of Search .................. 355/3 R, 14 R, 14 E, 355/8, 35, 47, 49, 55, 56, 57, 66, 70, 51, 45, 60; 362/32, 346; 360/6

[56] References Cited

U.S. PATENT DOCUMENTS

| | | | |
|---|---|---|---|
| 4,067,640 | 1/1978 | Shogren | 355/66 X |
| 4,312,588 | 1/1982 | Minoura et al. | 355/3 R X |
| 4,349,271 | 9/1982 | Toriumi et al. | 355/8 X |
| 4,350,433 | 9/1982 | Seto et al. | 355/8 |
| 4,355,891 | 10/1982 | Cole et al. | 355/3 R X |
| 4,358,199 | 11/1982 | Isago | 355/8 X |

Primary Examiner—A. C. Prescott

Attorney, Agent, or Firm—Lawrence E. Sklar; William D. Soltow, Jr.; Albert W. Scribner

[57] ABSTRACT

A line scanning, illuminating apparatus for use in an electrophotocopying machine. The apparatus includes a linear source of light, a hyperbolic reflector situated behind the linear light source, and a cylindrical lens located in front of the linear light source. The profile of the reflector is given by the equation:

$$y^2 = 2Bx\left[1 + \left(\frac{A-B}{A+B}\right)\right] - X^2\left[1 - \left(\frac{A-B}{A+B}\right)^2\right]$$

wherein the x and y axes intersect at the center line of the reflector, and wherein B is a positive quantity on the x axis representing the distance between the center line of the reflector and a virtual image of the light source created behind the reflector, and wherein A is a negative quantity representing the distance between the center line of the reflector and the linear light source located in front of the reflector.

3 Claims, 2 Drawing Figures

FIG. I

ELECTROPHOTOCOPIER LINE SCANNING ILLUMINATOR

BACKGROUND OF THE INVENTION

The instant invention relates to electrophotocopying machines, and more particularly to a line scanning illuminating device for use in an electrophotocopying machine requiring the subject to be illuminated by a narrow line of light.

Considerable efforts have been expended toward projecting a line of light onto an original document to be copied in an electrophotocopying machine. Concave reflecting surfaces of circular, elliptical, and parabolic contour and combinations thereof have been used with varying results for varying purposes. For micrifying purposes, that is, to intensify and concentrate reflected light from a source to an area at a predetermined location of lesser size than the area of the source, while minimizing the non-reflected stray light, circular and spheroidal reflecting surfaces have proved to be inadequate permitting an excessively high amount of non-utilized, non-reflected stray light to escape. Another approach to the scan line illumination problem has been that of gradient index fibers, which minimizes space requirements in the electrophotocopying machine, but which experience has shown to be an expensive solution.

The instant invention accordingly utilizes a hyperbolic reflector together with a cylindrical lens to provide the advantages of the gradient index fiber optics in that it requires only a small space for implementation in the electrophotocopying machine and is free of particular mechanical constraints which usually result from small space requirements, but is more economical than the gradient index fiber optics. Another advantage of the instant invention is that it employs a reflector whose curvature is less steep than that of conventional reflectors, thereby substantially reducing the cost of incorporating the reflector component into the electrophotocopying machine.

SUMMARY OF THE INVENTION

The instant invention provides a line scanning, illuminating apparatus for use in an electrophotocopying machine. The apparatus comprises a linear source of light, a hyperbolic reflector situated behind the linear light source, and a cylindrical lens located in front of the linear light source. The profile of the reflector is given by the equation:

$$y^2 = 2Bx\left[1 + \left(\frac{A-B}{A+B}\right)\right] - x^2\left[1 - \left(\frac{A-B}{A+B}\right)^2\right]$$

wherein the x and y axes intersect at the center line of the reflector, and wherein B is a positive quantity on the x axis representing the distance between the center line of the reflector and a virtual image of the light source created behind the reflector, and wherein A is a negative quantity representing the distance between the center line of the reflector and the linear light source located in front of the reflector.

DETAILED DESCRIPTION

Figure 1:
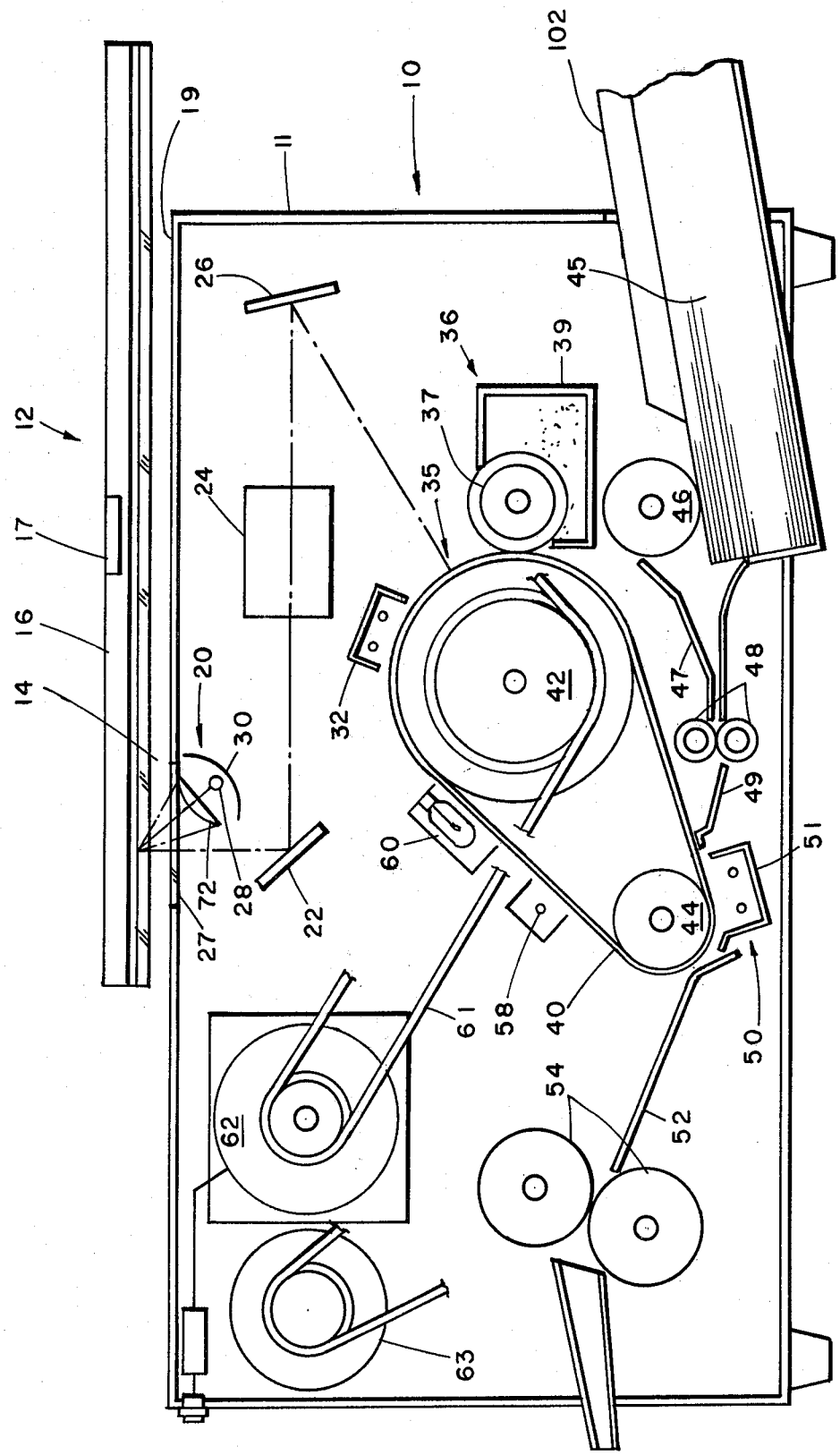
FIG. 1 is a schematic, side elevational view of an electrophotocopying machine employing an illuminating apparatus according to the instant invention.

In describing the instant invention, reference is made to the drawings, wherein there is seen in FIG. 1 a copier 10 having a rectangular reciprocating carriage 12 that is movably mounted on top of a cabinet 11. The carriage 12 includes a transparent platen 14 on which documents (not shown) are placed face down for copying. Overlying the platen 14 is an opaque, movable cover 16 which has a white surface juxtaposed to the platen 14. The cover 16 is connected to one side of the carriage 12. In the preferred embodiment, the cover 16 is made of a relatively flexible material that is connected by a hinge to one of the longer sides of the carriage 12. The cover 16 has a handle 17 disposed opposite to the hinged side of the cover 16. An operator can manipulate the handle 17 in order to raise and lower the cover 16 and so that documents can be placed on and removed from the platen 14.

The carriage 12 is shown in FIG. 1 in its extreme right or home position. During a copy cycle, the carriage moves to the left a predetermined distance that is long enough to enable the copier 10 to make copies of fourteen inch long documents. Underneath the carriage 12 is an illuminating station, generally indicated at 20, which includes a relatively narrow, transparent window 27 that is mounted on the upper surface 19 of the cabinet 11. The window 27 extends across the width of the upper surface 19. A light source is operatively disposed underneath window 27, and comprises a linear lamp 28 axially aligned and partially surrounded by a hyperbolic-shaped reflector 30 which serves to direct the light from the lamp 28 toward the window 27. As the carriage 12 moves from right to left, a document on the carriage 12 passes over the illumination window 27 and is illuminated by the light from lamp 28. In other words, the document is scan exposed across the illuminating station 20, which will be discussed in further detail hereinbelow.

An image of the document is transmitted to the photoreceptor belt 40 at an imaging station generally designated 35. The image is transmitted along a Z-shaped path by an optical system comprising tilted mirrors 22 and 26 and a lens 24. The mirror 22 forms an image of the illuminated document as the latter passes over the window 27, and reflects the light toward the converging lens 24, which is directed upon the second tilted mirror 26 which in turn reflects the coverging rays onto a portion of the photoreceptor belt 40 at the imaging station 35. The photoreceptor belt 40 is moved through the imaging station at a predetermined speed by a drive roller 42 in synchronism with the movement of the carriage 12 across the illuminating station 20. The motive power for turning the drive roller 42 is supplied by a main motor 62 through a suitable drive system that includes a drive chain 61 (partially shown), which also drives other elements including the magnetic brush 37, the carriage 12, and the feed and queuing rollers 46 and 48 respectively. The fixing rollers 54 are driven by a second motor 63.

The photoreceptor belt 40 is supported underneath the Z-shaped optical system 21 by the relatively large diameter drive roller 42 and also a relatively small diameter idler roller 44. The rollers 42 and 44 are diagonally displaced from each other and by virtue of the relative difference in their size, the photoreceptor belt 40 takes on a shape similar to a teardrop. The belt 40 itself comprises an upper photosensitive layer, preferably of zinc oxide (ZnO) that is coated on a conductive substrate, preferably one made of metalized polyester film, such as Mylar brand film with an aluminum base.

Disposed around the periphery of the photoreceptor belt 40 are a number of the operating components of the copier 10. In particular, a two-wire corona charging unit 32 is juxtaposed to the photoreceptor belt 40 at approximately a one o'clock position with respect to the drive roller 42. The charging unit 32 is operable to impart a uniform electrostatic charge to the zinc oxide surface of the photoreceptor 40. The drive roller 42 turns in a clockwise direction, so that the uniformly charged surface of the photoconductor belt 40 moves from the charging unit 32 toward the imaging station 35.

In accordance with the well-known photocopying technique, the light-struck areas of the photoreceptor belt 40 are electrically discharged, thereby leaving a latent (undeveloped) electrostatic image that corresponds to the indicia areas (printed portions) of the document that is to be copied.

As the drive roller 42 turns, the latent image on the photoreceptor belt 40 is carried past a developer station 36 disposed at a three o'clock position with respect to the drive roller 42. The developer station 36 includes a hopper 39 for holding a supply of developer material which typically is a two component toner consisting of iron filings and pressure fixable marking material; however, a single component toner can also be used. The rotating magnetic brush 37 picks up toner from the hopper 39 and carries that toner into contact with the photoreceptor 40. The charged or latent image areas of the photoreceptor 40 electrostatically attract and hold toner particles, thus developing the latent image.

The toned or developed image leaves the developer station 36 and moves toward the transfer station 50 where there is a two-wire corona transfer charging apparatus 51. In timed relationship with the arrival of the toned image at the transfer corona 51, a copy sheet also arrives at the transfer station 50. The copy sheet is fed from a supply of sheets 45 stored in a removable tray 102. A feed roller 46 feeds the uppermost copy sheet from the supply 45, through a paper guide 47 and into the nip of the queuing rollers 48. At a predetermined time in the course of a copy cycle, the queuing rollers 48 are actuated to feed the copy sheet along a second paper guide 49 and into contact with the developed image carried on the photoreceptor belt 40. By virtue of the electric charge that is generated by the transfer corona 51, toner particles are attracted from the photoreceptor belt 40 toward the copy sheet to which they loosely adhere.

The copy sheet is separated from the photoreceptor belt 40 by the interaction of the small diameter idler roller 44 with the relative stiffness of the copy sheet. In other words, as the photoreceptor 40 passes around the idler roller 44, the copy sheet does not follow the belt 40. Instead, the leading edge of the copy sheet moves away from the belt 40 along a path that is initially tangent to the idler roller 44. The copy sheet is ultimately guided by another paper guide 52 into the nip of the pressure fixing rollers 54.

The pressure fixing rollers 54 include two stainless steel rollers that are spring loaded into contact with each other with a linear pressure of approximately three hundred pounds per linear inch, and are rotated such that the speed of a copy sheet through the rollers 54 is slightly slower than the speed at which the copy sheet is fed toward the rollers 54. This is necessary in order to assure that the rollers 54 do not prematurely pull the copy sheet from the photoreceptor belt 40, i.e. before transfer of toner to the copy sheet is complete, which would result in an imperfect, streaked copy. Hence, the copy sheet is permitted to buckle slightly before it is completely fed through the rollers 54. Such a slight buckle does no damage to the loosely held toner image that is carried on the copy sheet. Under the influence of the high pressure exerted on the pressure fixable toner by the rollers 54, the image is permanently fixed to the copy sheet as it passes through the fixing rollers 54 and into the receiving tray 56.

After the developed image is transferred, a residual latent electrostatic image and some untransferred toner remain on the photoreceptor belt 40. As the belt 40 continues along its path, it is carried past a single wire discharge corona 58 which neutralizes any charge on the untransferred toner. Next, the belt 40 passes underneath an array (preferably four) of incandescent erase lamps 60. Light from the erase lamps 60 illuminates the belt 40, discharges the residual latent image areas of belt 40 and thereby erases any remaining residual electrostatic image.

As the photoreceptor belt 40 begins it second cycle, the carriage 12 starts to return from its extreme left position (not shown) toward its extreme right or home position seen in FIG. 1. During the second cycle, the corona charger 32 and the transfer corona 52 are deactuated. By virtue of the effects of the erase lamps 60 and the discharge corona 58, the untransferred toner is now only loosely adhering to the photoreceptor belt 40. As the untransferred toner passes the magnetic brush 37, the latter attracts the untransferred toner from the belt 40 onto the magnetic brush 37. Hence, the magnetic brush 37 performs two functions: on the first cycle the magnetic brush 37 develops the latent electrostatic image and on the second cycle the magnetic brush 37 cleans the photoreceptor of any untransferred toner. Thus, after the second cycle, the photoreceptor belt 40 is cleaned of toner and ready to make another copy.

Figure 2:
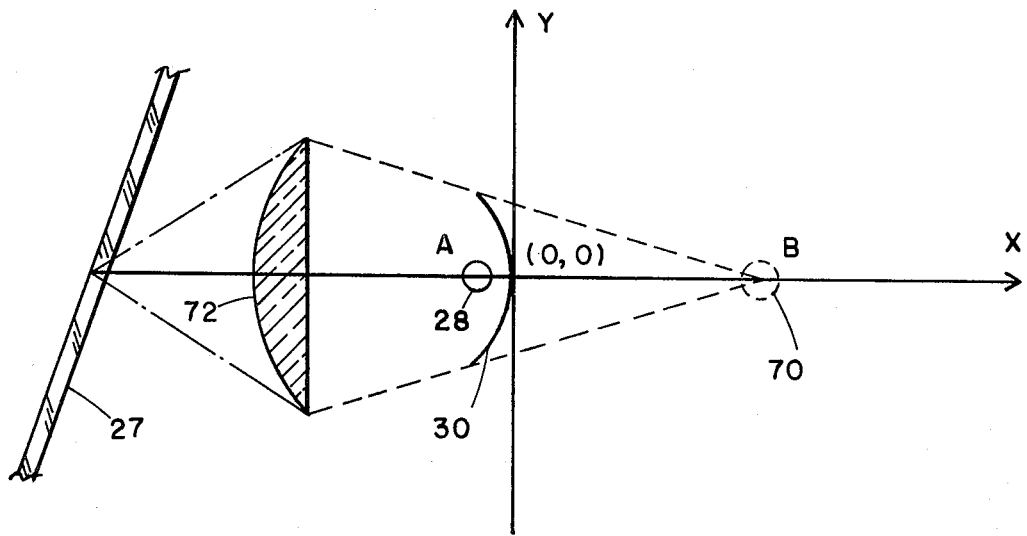
FIG. 2 is an enlarged, side elevational view of the illuminating apparatus seen in FIG. 1.

In describing the illumination system 20 in further detail, reference is made to FIG. 2 wherein the shape of the reflector 30 is more clearly seen. The profile of the reflector 30 is that of a hyperbola and is given by the equation:

$$y^2 = 2Bx\left[1 + \left(\frac{A-B}{A+B}\right)\right] - x^2\left[1 - \left(\frac{A-B}{A+B}\right)^2\right]$$

where B is a point on the x axis and represents the distance between the center line of the reflector 30 (at 0,0) and a virtual image 70 of the light source 28 created behind the reflector 30, and is a positive quantity, and where A is a point on the x axis and represents the distance between the center line of the reflector 30 (at 0,0) and the linear light source located in front of the reflector 30 and is a negative quantity.

Situated in front of the light source 28 is a cylindrical lens 72, which may also be a Fresnel lens if so desired. The virtual image 70 is very nearly aberration free and is presented as the object to the cylindrical or Fresnel lens 72 for reduction by proper object-image conjugate choice to a line image which is nearly aberration free (suffering only from the axial aberration of the lens) given proper construction and alignment of the individual components. Since the collection angle can be made relatively large, the flux apparently emanating from the virtual image 70 can be substantial and is only modified, in an ideal sense, by the transmissions of the lens and object glass (if present) and the reflectance of the reflector 30.

An additional benefit of the foregoing system is that the direct component of illumination (not shown) is somewhat compressed over standard illuminating systems and therefore contributes more readily to useful illumination.

While there have been shown and described and pointed out the fundamental novel features of the invention as applied to a preferred embodiment, it will be understood that various omissions and substitutions and changes in the form and details of the device illustrated and in its operation may be made by those skilled in the art without departing from the spirit and scope of the invention.

What is claimed is:

1. A line scanning, illuminating apparatus, for use in an electrophotocopying machine, comprising:
   a linear source of light;
   a hyperbolic reflector situated behind the linear light source, the profile of the reflector being given by the equation:

$$y^2 = 2Bx\left[1 + \left(\frac{A-B}{A+B}\right)\right] - X^2\left[1 - \left(\frac{A-B}{A+B}\right)^2\right], \text{ where}$$

$B =$ a point on the x axis and represents the distance between the center line of said reflector and a virtual image of the light source created behind said reflector, and is a positive quantity, and
   $A =$ a negative quantity representing the distance between the center line of said reflector and the linear light source located in front of said reflector; and
   a cylindrical lens located in front of said linear light source.

2. An electrophotocopying machine having a line scanning, illuminating apparatus therein, comprising:
   a linear source of light;
   a hyperbolic reflector situated behind the linear light source, the profile of the reflector being given by the equation:

$$y^2 = 2Bx\left[1 + \left(\frac{A-B}{A+B}\right)\right] - X^2\left[1 - \left(\frac{A-B}{A+B}\right)^2\right], \text{ where}$$

$B =$ a point on the x axis and represents the distance between the center line of said reflector and a virtual image of the light source created behind said reflector, and is a positive quantity, and
   $A =$ a negative quantity representing the distance between the center line of said reflector and the linear light source located in front of said reflector; and
   a cylindrical lens located in front of said linear light source.

3. The electrophotocopying machine of claim 2, further comprising a reciprocating carriage.

* * * * *